Jan. 24, 1961 S. E. COBLITZ 2,968,822
COMBINATION THREAD-CUTTING TOOL AND REAMER
Filed Oct. 15, 1959 2 Sheets-Sheet 1
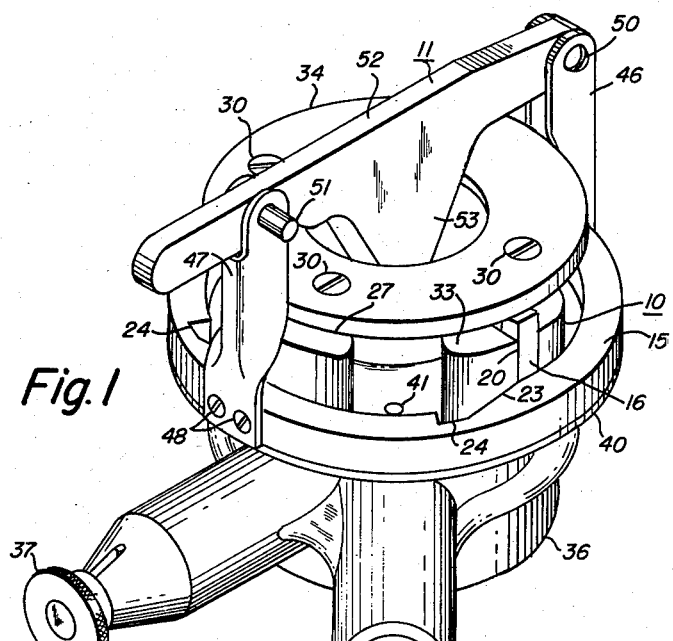
Fig. 1
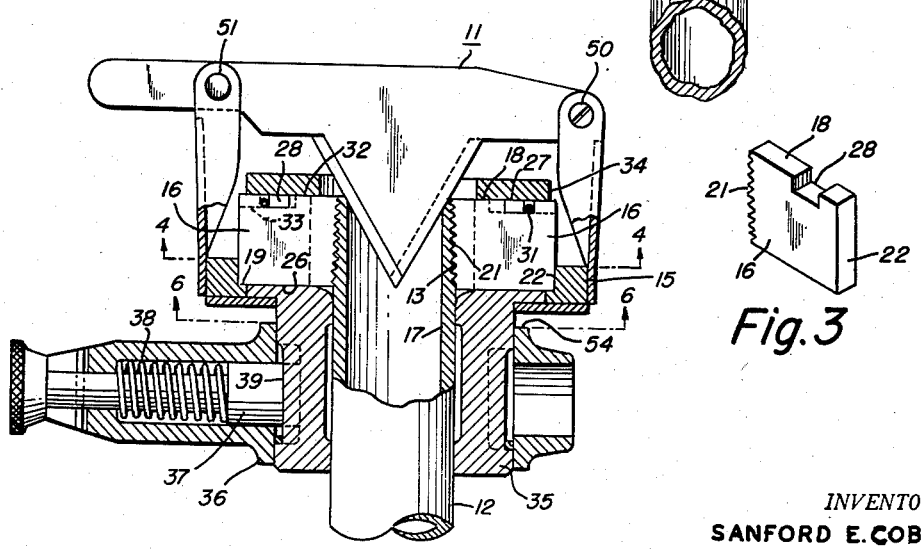
Fig. 2
Fig. 3
INVENTOR.
SANFORD E. COBLITZ
BY
Woodling and Krost
ATTORNEYS Jan. 24, 1961     S. E. COBLITZ     2,968,822
COMBINATION THREAD-CUTTING TOOL AND REAMER
Filed Oct. 15, 1959     2 Sheets-Sheet 2

INVENTOR.
SANFORD E. COBLITZ
BY
ATTORNEYS

United States Patent Office 2,968,822
Patented Jan. 24, 1961

2,968,822

COMBINATION THREAD-CUTTING TOOL AND REAMER

Sanford E. Coblitz, 567 Knollwood Ave., Ashtabula, Ohio

Filed Oct. 15, 1959, Ser. No. 846,580

3 Claims. (Cl. 10—87)

The invention relates in general to a combination die head and reamer and more particularly to friction means for releasing the die head from a threaded pipe in response to the torque created by the reamer.

An object of the invention is to provide a means for releasing a threaded pipe from a die head by radially moving the thread cutting elements from a pipe threading position to a non-pipe threading position.

Another object of the invention is to provide, in a combination die head and reamer, a releasing means for releasing the die head from a threaded pipe by radially moving the thread cutting elements from a pipe threading position to a non-pipe threading position, in which the releasing means is controlled by the torque or frictional force created by the reamer.

Another object of the invention is to provide, in a combination die head and reamer, a releasing means for releasing the die head from a threaded pipe by radially moving the thread cutting elements from a pipe threading position, in which the releasing means is controlled by a reamer and governed by the threading force exerted by the thread cutting action.

Another object of the invention is to provide, in a combination die head and reamer, a releasing means for releasing a die head from a pipe by radially moving the thread cutting elements from a pipe threading position to a non-pipe threading position, in which the releasing of the die head from the pipe is responsive to the type of material of the pipe being threaded and reamed.

Another object of the invention is to provide, in a combination die head and reamer, a collar which is annularly mounted around the die head and having collar cam portions against which the thread cutting elements frictionally engage when the cutting elements are in a thread cutting position and thereby establishing a friction between the collar and the cutting elements for holding the reamer in a stationary position relative to the pipe for cutting and reaming any burrs on the inside of the end of a pipe at the same time that it is threaded.

Another object of the invention is to provide, in a combination die head and reamer, a collar which is annularly mounted around the die head and which holds the thread cutting elements in a thread cutting position when the frictional force between the cutting elements and the collar is greater than the opposing force of the reamer when cutting the inside edge of the end of a pipe at the same time that it is threaded.

Another object of the invention is to provide, in a combination die head and reamer, a collar which is annularly mounted around the die head and which holds the thread cutting elements in a thread cutting position when the frictional force between the cutting elements and the collar is greater than the opposing force of the reamer when cutting the inside edge of the end of a pipe at the same time that it is threaded, and which releases the thread cutting elements to a non-thread cutting position when the frictional force between the reamer and the pipe is greater than the frictional force between the thread cutting elements and the collar.

Another object of the invention is to provide, in a combination die head and reamer, a means of releasing a die head from a pipe, whereby it will not be necessary to turn the tool back off the pipe.

Other objects and a fuller understanding of this invention may be had by referring to the following description and claims, taken in conjunction with the accompanying drawings, in which:

Figure 1 shows a perspective view of the invention;

Figure 2 shows a cross-sectional view which embodies the features of the invention;

Figure 3 shows a perspective view of a threaded cutting element;

Figure 4:
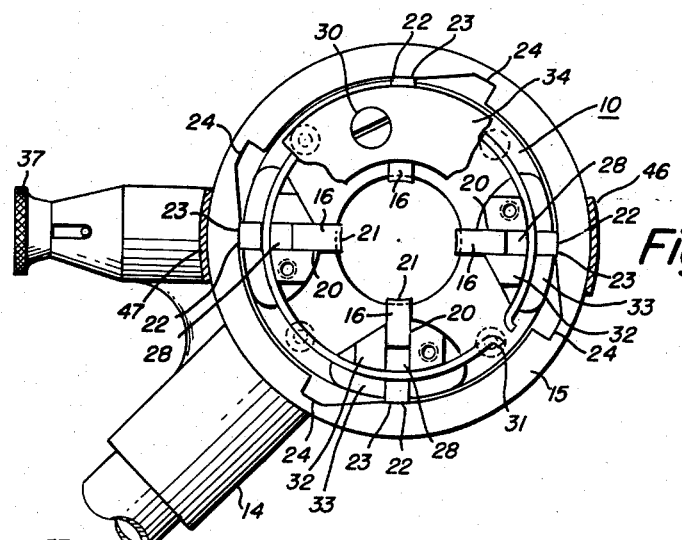
Figure 4 shows an end view of the invention, looking in a direction towards the open end of the pipe, the die head being shown in a thread cutting position.

With respect to Figure 1, the invention relates to a combination die head and reamer assembly which comprises a die head body 10 and a reamer 11 adapted to be operated by a ratchet handle 14, a collar 15 annularly mounted around the die head body 10 and adapted to support the reamer 11, and thread cutting elements 16 mounted in the die head body 10 and controlled by the position of the collar 15. The combination die head and reamer is adapted to thread and ream a pipe 12.

The die head body 10 had radially extending slots 20 which are disposed at spaced intervals around the die head. In actual practice, any workable number of slots 20 may be used, but in the invention four slots are used which are spaced at right angles to each other.

Figure 5:
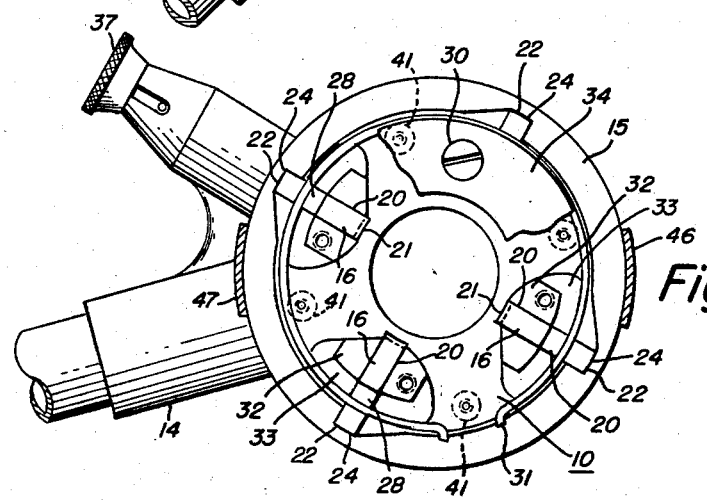
Figure 5 shows an end view of the invention similar to Figure 4, the die head being shown in a non-thread cutting position.

The thread cutting elements 16 or dies, one of which is shown in Figure 5, have a circumferential surface 22 at the outer end, thread cutting teeth 21 at the inner end, and a notch 28 in a side thereof. The surface 22 constitutes a cam rider surface. The thread cutting elements 16 are mounted in each of the four slots, whereby they are allowed to move in a radial direction between a pipe cutting position and a non-pipe cutting position.

The outer end portion of the die head body in which the slots 20 are disposed is provided with stepped surfaces, an upper surface 32 and a lower surface 33. A cover or end plate 34 is connected to the upper surface 32 by means of screws 30. The lower surface 33 of the die head body are on the same plane or level as the notches 28 in the dies, thereby providing an annular space around the die head body 10. An annular loop spring 31 is mounted in the annular space and engages a side wall of the notches 28 to provide a means of radially urging the dies to a non-thread cutting position. The upper stepped surface 32 extends slightly higher than the dies 16 so that when the cover 34 is connected to the upper surface 32 by means of screws 30, the under side 27 of the cover plate 34 will not bind the side surface 18 of the dies 16 thereby allowing the dies 16 to move freely in a radial direction. The cover plate 34 provides a means of keeping the dies 16 from escaping from the slots 20.

Figure 6:
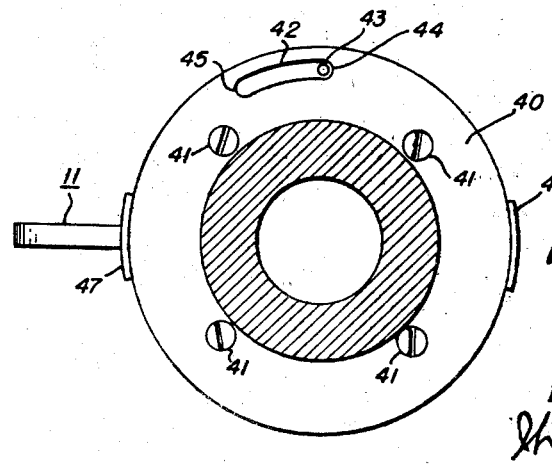
Figure 6 shows a plan view of a collar plate which holds the collar against axial movement, and taken along the line 6—6 of Figure 2.

The collar 15 is mounted around the die head body 10 and may be moved or oscillated back and forth in an annular direction around the die head body 10, between first and second circumferential positions. In the first position, the collar 15 has collar cam portions 23 against which the cam rider surface 22 of the threading elements 16 engage. In the second position, the collar 15 has depression means 24 into which the cam rider surfaces protrude. With reference to Figure 2, the rearward portion of the die head 10 has a shoulder against which a stepped side 19 of the collar 15 slidably engages to hold the collar against axial movement in a direction toward the outer end of the die head. A collar plate 40 is also connected to the rearward portion of the die head body 10 by means of screws 41 which hold the collar against axial movement in a direction toward the rearward end of the die head. The collar plate 40, see Figure 6, has a slot 42 whereby a stop pin 43 which is connected to the collar 15 protrudes through the slot 42 which allows the collar 15 to only rotate or oscillate back and forth a certain number of degrees depending upon the length of the slot 42. The ends of the slot 42 are identified by the reference characters 44 and 45. When the pin 43 is in the position next adjacent the end 44, the die head body 10 is in a non-thread cutting position. When the pin 43 is in the position next adjacent the end 45, the die head body 10 is in a thread cutting position.

The ratchet used in the invention is an ordinary conventional ratchet comprising a male ratchet member 39 mounted into the ratchet body 35 and is engaged by a pawl 37, see Figure 2. The pawl 37 is carried by the ratchet body 35 surrounding the male ratchet member and is adapted to be operated by the ratchet handle 14. The face of the pawl 37 which engages the male ratchet member 39 is made at an angle so that when the die head body 10 is turned annularly in one direction, the pawl will slide over the male ratchet member, but it will not slide annularly in the opposite direction. The pawl 37 can be turned interchangeably in order to provide the die head body 10 with either an annular rearward or annular forward direction. A spring 38 keeps the pawl 37 forced against the male ratchet member.

With reference to Figure 4, the drawing shows the dies 16 in a pipe threading position with the collar 15 in the first circumferential position. In the thread cutting position the collar 15 is positioned so that the collar cam portions 23 thereof engage the cam rider surfaces 22 of the dies 16 and holds the dies in a stable position during the threading operation.

With reference to Figure 5, the drawing shows the dies or the thread cutting elements 16 in a non-pipe threading position with the collar 15 in the second circumferential position. In the non-thread cutting position, the cam rider surface 22 of the dies 16 protrude in the depressed portions or depression means 24 whereby it will not be necessary to turn the tool back off the pipe after the threads 13 on the pipe are once cut.

The reamer 11 which comprises a lever 52 and cutter 53, is connected to the collar 15 by means of two brackets 46 and 47. The bracket 46 is connected to the collar 15 by screws 49 and the bracket 47 is connected to the collar 15 by screws 48. The reamer lever 52 may be pivotally connected to the bracket 46 by means of a pivot pin 50. When the pipe 12 is in a threading position, the reamer lever 52 is locked to the bracket 47 by a lock pin 51. When pin 51 is removed, the reamer 11 may be swung away from the die head about the pivot pin 50.

During the pipe threading operation, when the threading elements engage the outside of the pipe 12, a frictional resistance is obtained between the collar cam surface 23 of the collar 15 and the cam rider surface 22. The frictional force between these two surfaces 22 and 23 under the force of the threading operation may be referred to as threading frictional force and is great enough to keep the collar in a thread cutting position and in turn allows the reamer 11 to cut out any burrs and ream the inside edge 17 of the pipe 12 at the same time that the pipe is being threaded. When the reaming frictional force between the reamer 11 and the inside edge 17 of the pipe 12 is greater than the threading frictional force between the cam rider surface 22 of a die 16 and the collar cam portion 23 of the collar 15, the collar is tripped and is turned in an annular direction to a non-thread cutting position as shown in Figure 5. The reamer does not have any spring or resilient means holding the collar 15 in a thread cutting position, but relies on the principle of friction. In threading different grades of metal, the die head and reamer will react accordingly, that is to say, the threading frictional forces between the cam rider surfaces 22 and the collar cam portion 23 and the reaming frictional force between the cutting edge 53 of the reamer 11 and the inside edge 17 of the pipe 12 will vary according to the hardness or softness of the metal pipe. The elimination of a spring is important because when a different type of pipe material is threaded the spring has to be adjusted so that the collar will trip at the right time thereby allowing the reamer to clean the inside edge of the pipe effectively. In the invention, the type of material used in the pipe that is threaded sets up cutting forces at the threads and at the reamer directly proportional to the hardness of the material used in the pipe. For example, in threading aluminum pipe the force exerted against the thread cutting elements is less than the force exerted when threading a steel pipe. When there is less force applied against the thread cutting elements such as when threading aluminum, the threading frictional forces between the rider surface 22 and the collar cam portion 23 of the collar 15 is less than when threading a steel pipe. An aluminum pipe requires less reaming frictional forces for reaming than does a steel pipe and accordingly the reamer will trip the collar 15 with less force than it would reaming a steel pipe.

In other words, the frictional forces of the die head and reamer increase and decrease proportionally to each other and tripping of the collar is automatically compensated with the type of pipe material used. The collar moves the reamer axially towards the inside edge surface of the pipe as the die head is turned for cutting threads on the pipe. The reamer upon engaging the inside edge surface of the pipe during the threading operation creates a reaming frictional force which tends to actuate said collar in opposition to said threading frictional force. The reaming frictional force upon becoming larger than said threading frictional force moves the collar to the second circumferential position with the depressed portions in alignment with the outer cam rider means of the thread cutting elements, whereby the thread-cutting elements may be moved to a non-pipe cutting position.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A combination thread-cutting tool and reamer for threading a pipe and for reaming the end surface of said pipe, said combination comprising a die head having radially extending slots disposed at annularly spaced intervals thereabout, a thread-cutting element mounted in each of said slots and slidably movable therein in a radial direction between a pipe-cutting position and a non-pipe cutting position, each said thread-cutting element having an inner end provided with thread-cutting teeth and an outer cam rider means disposed for actuation, an annular collar mounted on said die head circumferentially movable between a first and second circumferential position, means to mount said collar on said die head against movement in an axial direction, said collar in said first circumferential position having collar cam surface means engaging said outer cam rider means and holding said thread-cutting elements in said pipe-threading position, said thread cutting teeth in threading said pipe exerting an outward threading force urging said cam rider means of said thread cutting elements against said collar cam surface means and creating a threading frictional force tending to hold said collar in said first circumferential position, said collar in said second circumferential position having depression means in radial alignment with said outer cam rider means, radial movement of said outer cam rider means into said depression means positioning said thread cutting elements in said non-pipe cutting position, a reamer having a cutting edge disposed to cut the end surface of said pipe, and means to mount the reamer on said collar, said collar moving said reamer axially towards the end surface of the pipe as the die head is turned for cutting threads on the pipe, said reamer upon engaging the end surface of the pipe during the threading operation creating a reaming frictional force tending to actuate said collar in opposition to said thread-frictional force, said reaming frictional force upon becoming larger than said threading frictional force moving said collar to said second circumferential position with said depression means in alignment with said outer cam rider means of said thread-cutting elements, whereby said thread-cutting elements may be moved to said non-pipe cutting position.

2. A combination thread-cutting tool and reamer for threading a pipe and for reaming the end surface of said pipe, said combination comprising a die head having radially extending slots disposed at annularly spaced intervals thereabout, a thread-cutting element mounted in each of said slots and slidably movable therein in a radial direction between a pipe-cutting position and a non-pipe cutting position, each said thread-cutting element having an inner end provided with thead-cutting teeth and an outer cam rider means disposed for actuation, an annular collar mounted on said die head circumferentially movable between a first and second circumferential position, means to mount said collar on said die head against movement in an axial direction, said collar in said first circumferential position having collar cam surface means engaging said outer cam rider means and holding said thread-cutting elements in said pipe-threading position, said thread-cutting teeth in threading said pipe exerting an outward threading force urging said cam rider means of said thread-cutting elements against said collar cam surface means and creating a threading frictional force tending to hold said collar in said first circumferential position, said collar in said second circumferential position having depression means in radial alignment with said outer cam rider means, radial movement of said outer cam rider means into said depression means positioning said thread-cutting elements in said non-pipe cutting position, resilient means engaging said threading cutting position, resilient means engaging said threading element and urging same radially outwardly, a reamer having a cutting edge disposed to cut the end surface of said pipe, and means to mount the reamer on said collar, said collar moving said reamer axially towards the end surface of the pipe as the die head is turned for cutting threads on the pipe, said reamer upon engaging the end surface of the pipe during the threading operation creating a reaming frictional force tending to actuate said collar in opposition to said thread-frictional force, said reaming frictional force upon becoming larger than said threading frictional force moving said collar to said second circumferential position with said depression means in alignment with said outer cam rider means of said thread-cutting elements, whereby said thread-cutting elements may be moved to said non-pipe cutting position.

3. A combination thread-cutting tool and reamer for threading a pipe and for reaming the end surface of said pipe, said combination comprising a die head having radially extending slots disposed at annularly spaced intervals thereabout, a thread-cutting element mounted in each of said slots and slidably movable therein in a radial direction between a pipe-cutting position and a non-pipe-cutting position, each said thread-cutting element having an inner end provided with thread-cutting teeth and an outer cam rider means disposed for actuation, an annular collar mounted on said die head circumferentially movable between a first and second circumferential position, means to mount said collar on said die head against movement in an axial direction, said collar in said first circumferential position having collar cam surface means engaging said outer cam rider means and holding said thread-cutting elements in said pipe-threading position, said thread cutting teeth in threading said pipe exerting an outward threading force urging said cam rider means of said thread-cutting elements against said collar cam surface means and creating a threading frictional force tending to hold said collar in said first circumferential position, said collar in said second circumferential position having depression means in radial alignment with said outer cam rider means, radial movement of said outer cam rider means into said depression means positioning said thread cutting elements in said non-pipe cutting position, a reamer having a cutting edge disposed to cut the end surface of said pipe, and detachable means to mount the reamer on said collar whereby said reamer may be detached from said collar, said collar moving said reamer axially towards the end surface of the pipe as the die head is turned for cutting threads on the pipe, said reamer upon engaging the end surface of the pipe during the threading operation creating a reaming frictional force tending to actuate said collar in opposition to said thread-frictional force, said reaming frictional force upon becoming larger than said threading frictional force moving said collar to said second circumferential position with said depression means in alignment with said outer cam rider means of said thread-cutting elements, whereby said thread-cutting elements may be moved to said non-pipe cutting position.

References Cited in the file of this patent
UNITED STATES PATENTS
564,700    Kupsch _____ July 28, 1896